United States Patent [19]

Bening et al.

[11] Patent Number: 5,088,342
[45] Date of Patent: Feb. 18, 1992

[54] PIVOTABLE STEERING WHEEL MECHANISM AND BIASING MEANS

[75] Inventors: Curtis R. Bening, Burnett; Dean J. Tessenske, Horicon, both of Wis.

[73] Assignee: Deere & Company, Moline, Ill.

[21] Appl. No.: 616,560

[22] Filed: Nov. 21, 1990

[51] Int. Cl.$^5$ .......................... B62D 1/18; G05G 5/06
[52] U.S. Cl. ........................................ 74/493; 74/533; 74/538; 280/775
[58] Field of Search .................. 74/493, 533, 538, 540; 280/775; 403/92, 93, 95

[56] References Cited

U.S. PATENT DOCUMENTS

| | | | |
|---|---|---|---|
| 1,165,211 | 12/1915 | Sprouse | 74/538 |
| 1,261,859 | 4/1918 | Seiter | 403/93 X |
| 2,343,819 | 3/1944 | Taylor | 403/93 |
| 4,612,823 | 9/1986 | DeLeeuw et al. | 74/540 X |
| 4,941,766 | 7/1990 | Carlson | 74/493 X |
| 4,993,279 | 2/1991 | Doescher et al. | 74/493 |

FOREIGN PATENT DOCUMENTS

| | | | |
|---|---|---|---|
| 2904205 | 8/1979 | Fed. Rep. of Germany | 74/493 |
| 2027142 | 2/1980 | United Kingdom | 74/538 |

*Primary Examiner*—Allan D. Herrmann
*Assistant Examiner*—David W. Laub

[57] ABSTRACT

A tilt steering mechanism having a latch plate fixed to the vehicle and having recesses corresponding to particular tilted positions of the steering column. A member is carried by the steering column for tilting motion therewith, and has a first portion engagable with the recesses. A mechanism is provided for biasing the member toward engagement with the recesses, and includes a compression spring carried concentrically with the member and having a straightened portion abutable with a notch formed in the member. The member has a second portion that can be pushed by the operator to shift the member against the force of the biasing mechanism to disengage the member from the recesses. A mechanism is provided for enclosing the steering column and tilt mechanism throughout the range of tilting, and includes a cowl carried by a spring mounted on the steering column.

10 Claims, 4 Drawing Sheets

PIVOTABLE STEERING WHEEL MECHANISM AND BIASING MEANS

BACKGROUND OF THE INVENTION

1. Field of the Invention

The invention relates to mechanisms for adjusting and locking the position of tiltable steering wheels on vehicles such as lawn and garden tractors.

2. Description of the Related Art

It is known to provide vehicles with tilt steering mechanisms to allow the operator to adjust the inclination of the steering column. These mechanisms allow the steering wheel to be shifted upwardly to allow the operator more room to mount and dismount the vehicle. They also allow the steering wheel to be adjusted to the operating position most comfortable for a particular operator. Typical mechanical steering mechanisms provide a universal joint in the column that accommodates pivoting of the upper portion of the column. Hydraulic steering mechanisms, on the other hand, often provide a steering wheel mounted on a short pivotable steering column, and provide a flexible hydraulic coupling between the tiltable column and the steerable ground engaging wheels.

Conventional tilt mechanisms also provide assemblies that lock the steering column in a desired operating position. These locking mechanisms can be released by an operator so that the steering column and steering wheel can be adjusted to a different position.

Tilt lock controls found on automobiles are typically located on the steering column between the steering wheel and the dash. The control is typically a lever that is coupled to a series of cams, linkages and levers within the steering column. These linkages extend down the column from the control lever to the locking mechanism. The control lever is actuated to release the locking mechanism via the linkage. The locking mechanisms typically provide a toothed assembly that engages an element or another toothed assembly to lock the column in position.

Typical tilt steering wheel mechanisms on automobiles are relatively complicated due to the large number of parts utilized in the linkage that extends between the control lever and the locking mechanism and within the steering column. Therefore, these mechanisms are relatively costly to manufacture and assemble.

The placement of the control lever on the column between the steering wheel and the dashboard may interfere with the operation and view of other instruments located on the dash near the steering wheel. Therefore, the steering wheels of automobiles are positioned a relatively large distance away from the dash in order to make room for the control lever. These mechanisms are therefore not well suited for use on lawn and garden tractors, which usually have a short distance between the steering wheel and dash due to limited space in the operator station. Also, lawn and garden tractors often provide gauges and controls on the dash near the steering column, such that positioning a tilt steer control lever on the steering column may overcrowd the instrument panel and make it difficult to reach and manipulate the various controls on the dash.

In addition, tilt steering wheel mechanisms found on automobiles are typically not adapted for sealing the mechanisms from exposure to the elements, since the operator stations and tilt steering mechanisms of automobiles are usually enclosed within cabs. Therefore, many automotive tilt steering mechanisms are not readily adaptable for use on lawn and garden tractors, which typically expose operator stations to the elements.

Tractors and other off-road vehicles have provided tilt steering mechanisms. Many such vehicles provide only a short distance between the steering wheel and dash, or provide controls or gauges on the dash near the column, and therefore do not provide a tilt control lever on the steering column. Rather, many of these vehicles locate the tilt control on a console near the operator's legs. Many such controls must be pulled by the operator in order to release the steering column lock. Therefore, an operator wearing gloves may find it difficult to grasp the control and release the steering column position lock.

Off-road vehicles often provide assemblies for enclosing or sealing the tilting mechanisms from exposure to the elements. However, since the steering columns are shiftable to a variety of different positions, many such enclosures do not effectively exclude the elements from the internal workings of the steering mechanism. The enclosures that do effectively seal the steering column mechanism are often costly to manufacture and assemble.

Tilt steering mechanisms used on lawn and garden tractors and other off-road vehicle's typically provide a linkage between the tilt control knob and the internal locking mechanism. Like the automobile tilt mechanisms, the use of a linkage having many parts complicates the manufacture of the assembly and makes the mechanism more costly.

Both automobiles and off-road vehicles provide mechanisms for biasing the tilt mechanism toward a locked position. Springs are often used as the main component in biasing mechanisms, and are held in place by such means as cotter pins positioned within drilled holes, washers that abut upraised portions in rods, or snap rings held within grooves. These biasing mechanisms are typically comprised of a plurality of parts that are relatively time consuming and costly to assemble.

Therefore, it would be advantageous to provide a pivotable steering wheel mechanism for use with an open-cabbed vehicle that utilizes a small number of parts and is relatively inexpensive to manufacture. Also, it would be advantageous for such a mechanism to have its control means located below the vehicle dash near the operator's legs. It would be advantageous for the control for this mechanism to be pushable by the operator such that the release of the locking device is made easy in a variety of conditions, for example, when the operator's hand is gloved. It would also be advantageous for such a mechanism to provide an inexpensive and effective enclosure that will effectively seal the mechanism from the surrounding weather conditions regardless of the steering column's pivoted position. It would be desirable to provide a simple and effective mechanism for coupling a biasing spring to a member that is relatively simple and easy to assemble.

SUMMARY OF THE INVENTION

The tilt steering column mechanism according to the preferred embodiment of the present invention provides a mechanism for adjustably locking the inclination of a vehicle's tiltable steering column. A latch plate is rigidly fixed to the vehicle and has a plurality of recesses each corresponding to a particular tilted position of the steering column. A rod-like member is carried by the steering column for tilting motion therewith, and has a first portion engagable with the recesses. The first portion extends at an angle to the rest of the member for engagement with the recesses. The member has an engaged mode wherein the first portion is engaged within one of the recesses to operatively fix the steering column at the corresponding tilted position. The member also has a disengaged mode wherein the first portion is disengaged from the recesses to thereby allow the column to tilt to a different position. A mechanism is provided for biasing the member toward the engaged mode, and comprises a compression spring concentrically carried by the member and having a straightened portion that abuts against a notch formed in the member. The member has a second portion pushable by the operator to shift the member against the force of the biasing means and to shift the member from an engaged mode to a disengaged mode. The preferred embodiment provides a dash having an opening within which the column is tiltably positioned. A rigid cowling is carried by the column in slidable abutment with the edges of the dash opening for generally enclosing the steering column and tilt mechanism. A button control is pivotally carried by the cowling and is positioned to be pressed by the operator in a direction generally aligned with the member's path of travel as the member shifts between the engaged and disengaged modes. The button is abuttable with the member's second portion for shifting the member from the engaged mode to the disengaged mode as the operator presses the button control. Guide means is also provided for guiding the first portion between the engaged and disengaged modes.

DESCRIPTION OF THE PREFERRED EMBODIMENT

Figure 1:
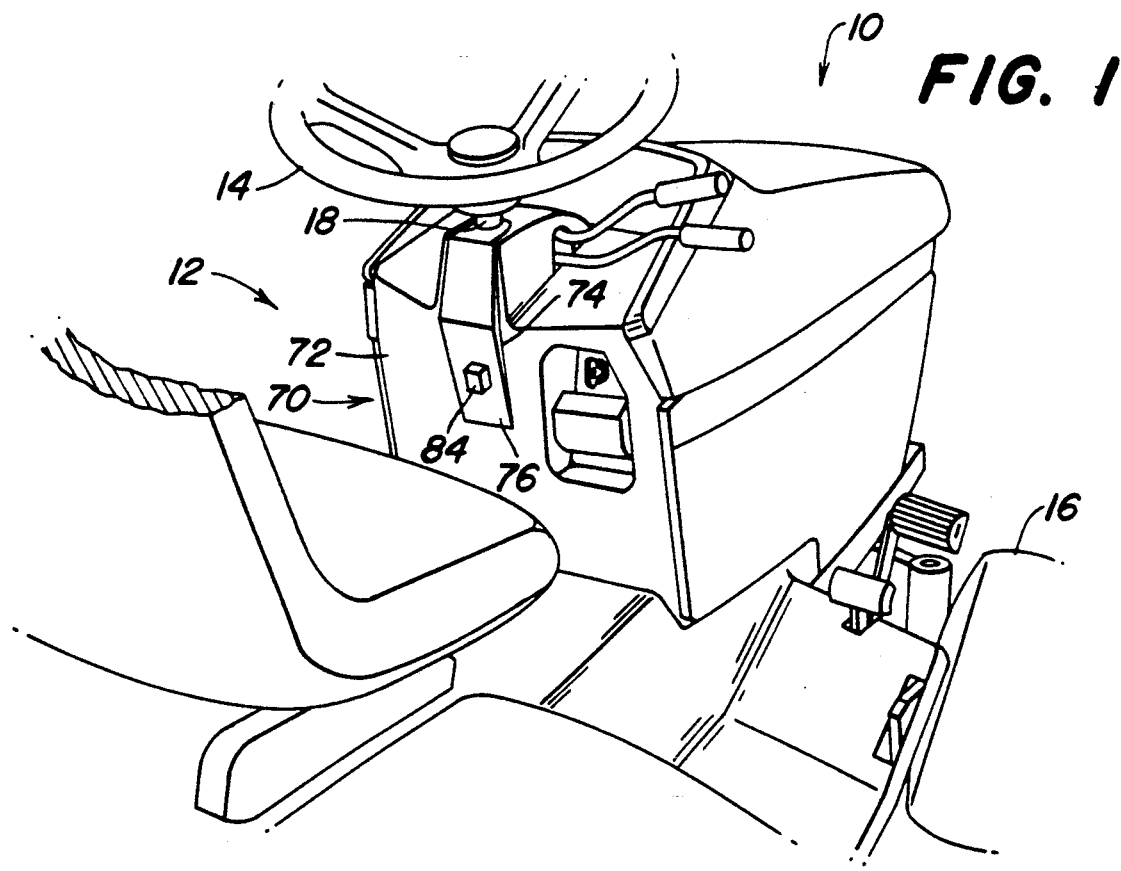
FIG. 1 is a perspective view of an operator station of a vehicle having the preferred embodiment of the present invention.

Referring now to FIG. 1, there is shown a vehicle 10, and an operator station 12 from which an operator controls the speed and direction of the vehicle 10. A steering wheel 14 is provided that can be controlled by the operator to turn ground engaging wheels 16 and thereby change the vehicle's direction of travel. A steering column 18 serves as part of the linkage between the steering wheel 14 and the ground engaging wheels 16. As the steering wheel 14 is turned by the operator, the steering column 18 rotates about its longitudinal axis to transfer the rotational motion of the steering wheel 14 to the steerable ground engaging wheels 16.

Figure 3:
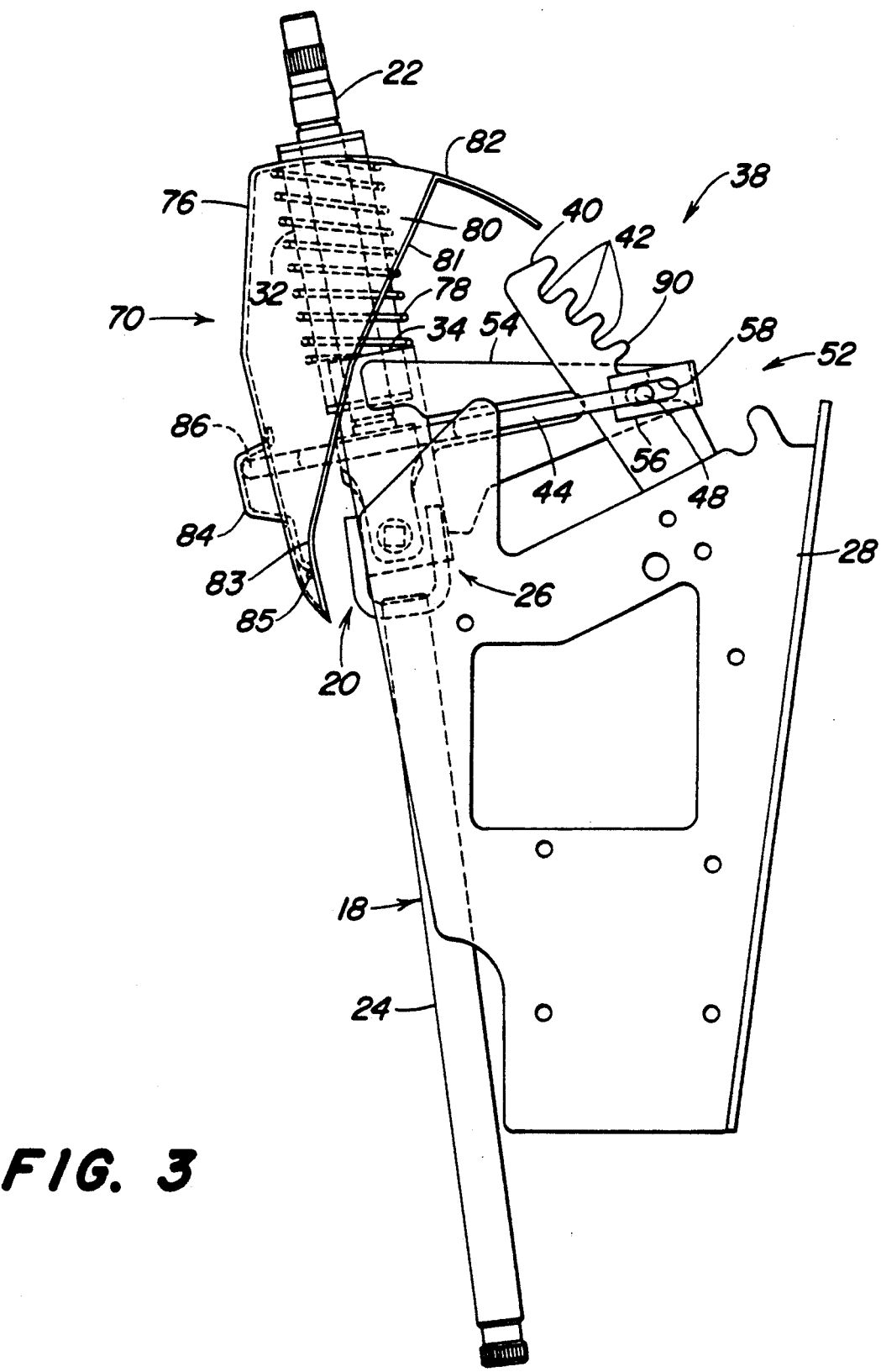
FIG. 3 is a side view of the present invention with the locking mechanism in an engaged mode.

The preferred embodiment of the present invention provides a mechanism 20, as shown in FIG. 3, for allowing the steering column 18 to pivot or tilt. The steering column 18 has upper 22 and lower 24 portions coupled together by a conventional universal joint 26. The lower portion 24 remains fixed with the vehicle frame 28 for rotation about its longitudinal axis, whereas the upper portion 22 is pivotable or tiltable about the universal joint 26. The universal joint 26 allows the transfer of rotational motion from the upper portion 22 to the lower portion 24 regardless of the upper portion's tilted position.

Figure 2:
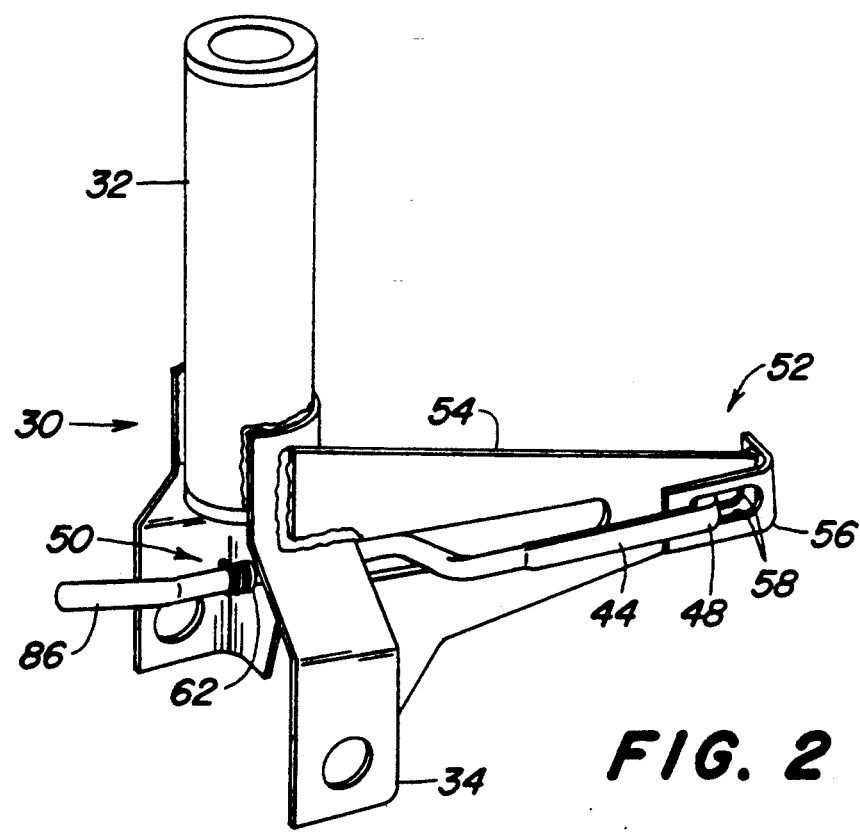
FIG. 2 is a partial perspective view of the support structure, push member, and guide means according to the present invention.

Referring now to FIG. 2, a support structure 30 is shown that is provided by the preferred embodiment for supporting the upper portion 22 of the column 18 throughout its range of pivotal motion. A support tube 32 is provided through which the upper portion 22 is rotatably journalled. The support tube 32 is welded or otherwise fixed to a bracket 34 that is conventionally pivotally coupled to the vehicle frame 28. The bracket's pivotable coupling to the frame 28 defines the axis about which the bracket 34 and tube 32 pivot. The universal joint 26 is positioned generally within the bracket 34.

Figure 4:
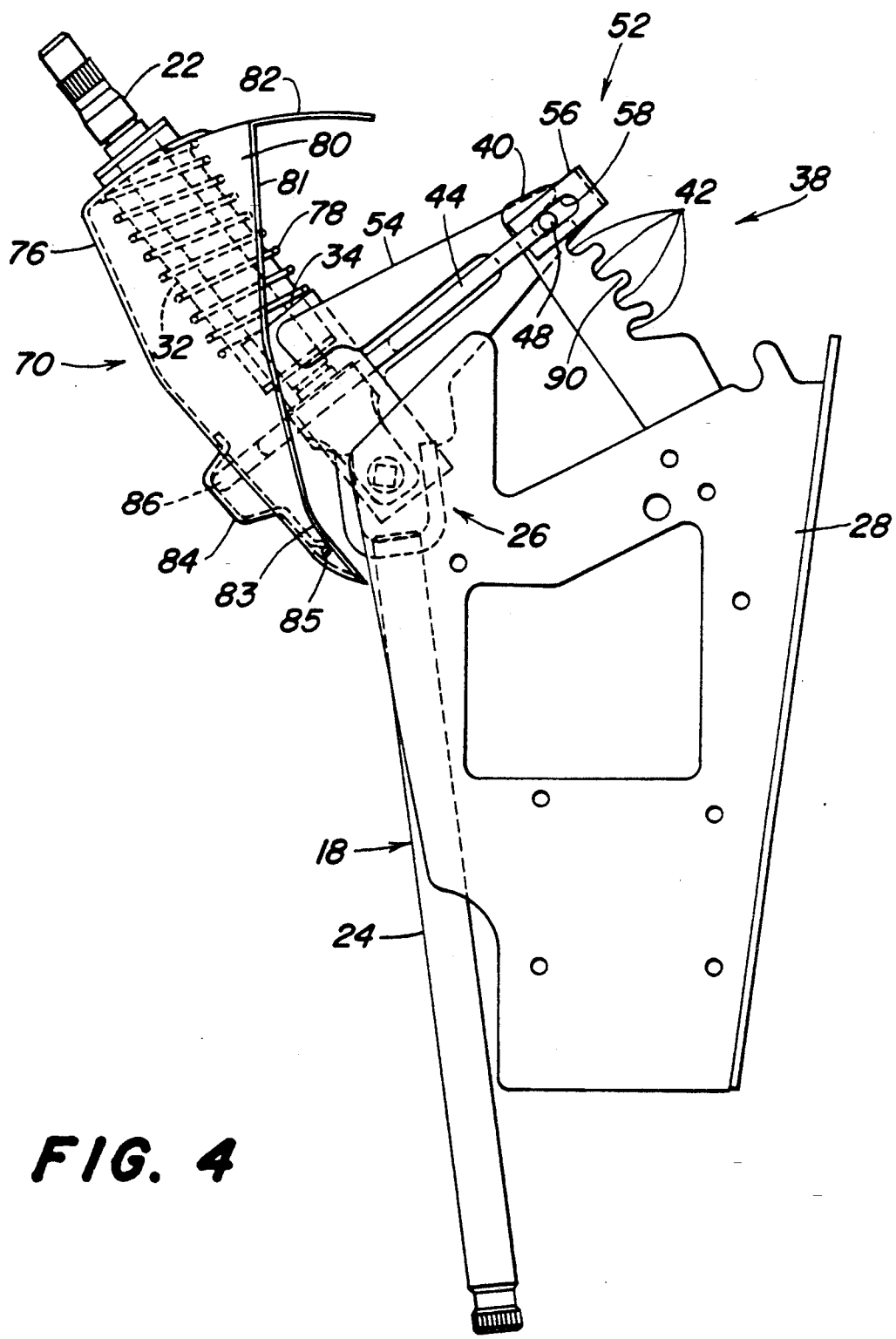
FIG. 4 is a side view showing the locking mechanism in an engaged mode and in a different tilted position than that shown in FIG. 3.
Figure 5:
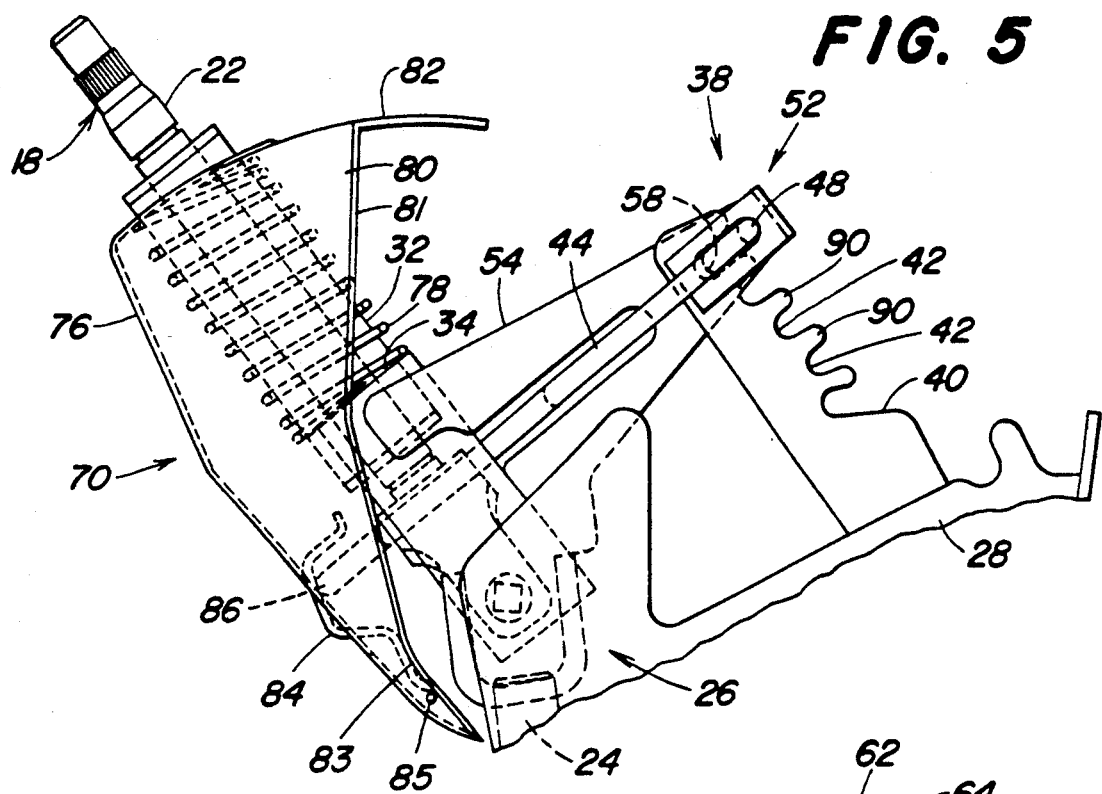
FIG. 5 shows a side view of the present invention with the locking mechanism in a disengaged mode.

As shown in FIGS. 3, 4 and 5, a latching or locking mechanism 38 is provided in the preferred embodiment of the present invention for locking the pivoted position of the upper portion 22 of the column 18. A latch plate 40 is rigidly fixed to the vehicle frame 28, and has recesses or notches 42 arranged generally in an arc. A push member 44 is positionable within one of the latch plate recesses 42 to fix or secure the column 18 in a particular tilted position during operation. The rod-like push member 44 passes through a hole 46 in the bracket 34 (see FIG. 6) and has a bent first portion 48 for engaging the latch plate recesses 42. A biasing means 50, as shown in FIG. 6, acts on the member 44 to urge the push member's first portion 48 toward engagement with the recesses 42.

A guide means 52, as shown in FIGS. 2-5, is provided for guiding the push member's first portion 48 into and out of engagement with the recesses 42. A primary guide plate 54 is welded to the bracket 34, and a secondary guide plate 56 is welded to one end of the primary guide plate 54. Slots 58 are formed in the guide plates 54, 56 for slidably receiving the push member's first portion 48. A pin mechanism (not shown) is positioned within a hole 60 to keep the first portion 48 of the push member 44 secured within the slots 58. The latch plate 40 is positioned between the two guide plates 54, 56 during operation.

Figure 7:
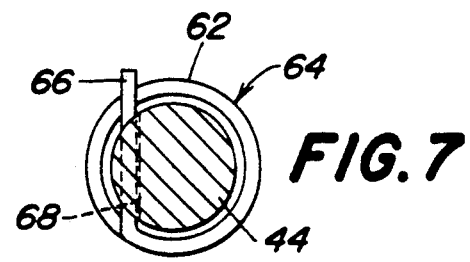
FIG. 7 is a cross-section of the biasing means and push member as viewed at 7—7 in FIG. 6.
Figure 6:
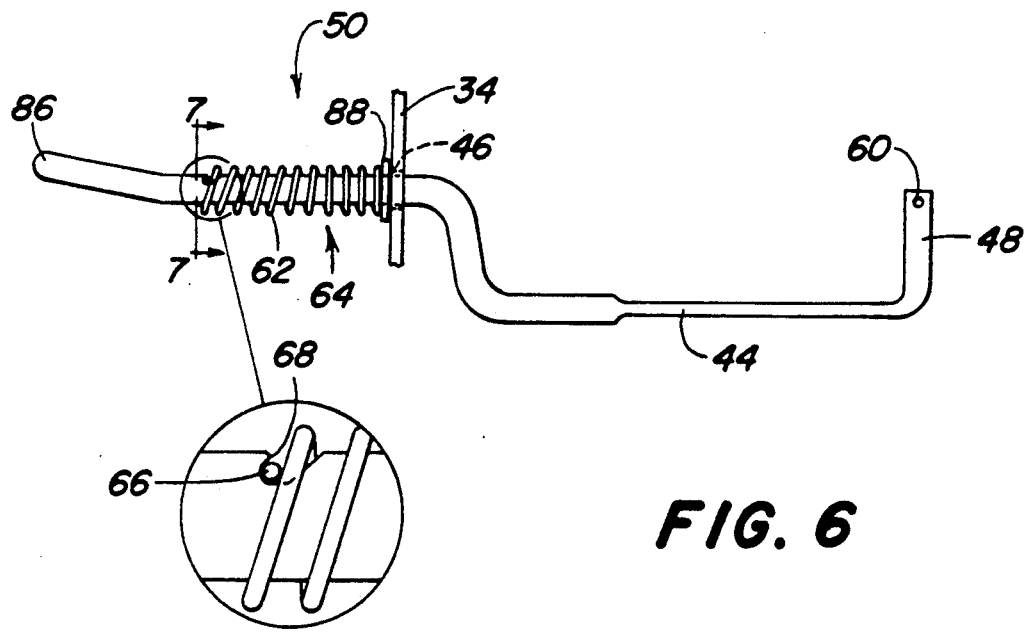
FIG. 6 illustrates a partial view of the push member and biasing means according to the present invention.

The biasing means 50, as best seen in FIG. 6 and 7, includes a notch 68 formed in the push member 44, and a compression spring 62 carried concentrically with the push member 44. The spring 62 has a conventional coiled portion 64, and an inwardly aligned flatted or straightened portion 66 at one end for abutment with the notch 68. The notch 68 can be formed in the push member 44 in any number of ways, such as by cutting the notch 68 into the push member 44 or cold forming the notch 68 when manufacturing the push member 44. The spring 62 is bent inwardly, as shown in FIG. 7, to define the straightened portion 66, such that the spring 62 has a smaller diameter at the straightened portion 66 than at the coiled portion 64. In other words, the flatted portion 66 is positioned closer to the axis about which the spring 62 is coiled than the coiled portion 64. Therefore, when the push member 44 is situated within the spring 62, the straightened portion 66 can abut the notch 68 defined in the push member 44.

The act of assembling the spring 62 onto the push member 44 is relatively simple and inexpensive. To assemble the biasing means 50 according to the preferred embodiment, the end of the spring 62 opposite the flatted feature 66 is slipped over the push member 44 until the flatted portion 66 meets the end of the push member 44. The spring 62 is then pushed further onto the push member 44, such that the straightened portion 66 deflects to pass around the full diameter of the push member 44. The spring 62 is then compressed further onto the push member 44 until the flatted feature 66 passes over the notch 68. The spring 62 can then be released, and can be expanded until the straightened portion 66 abuts against the notch 68. To remove the spring 62 from the push member 44, the spring 62 must be rotated such that the flatted portion 66 is not aligned with the notch 68. The spring 62 is then released, and the straightened portion 66 will pass next to the notch 68 without engaging it. The spring 62 can then be fully extended and removed from the end of the push member 44. Therefore, the biasing means 50 of the preferred embodiment is simpler and less costly to manufacture and assemble than other mechanisms for attaching a compression spring to a rod.

As seen in FIGS. 1 and 3, a mechanism 70 is also provided in the preferred embodiment that acts to enclose or seal the pivoting mechanism 20 from the environment. The vehicle 10 according to the preferred embodiment has a dashboard or console 72 located beneath the steering wheel 14 and extends to the floor of the operator station 12. An opening 74 is defined in the console 72 that accommodates the tilting of the column's upper portion 22. A plastic cowl 76 has an opening through which the tube 32 is positioned. A spring 78 carried on the tube 32 and in abutment with the bracket 34 presses upwardly on the cowl 76. The spring 78 thereby presses the upper wall 81 of the cowl 76 upwardly against the underside of the console 72. The cowl side walls 80 each have a laterally outwardly extending ledge 81 whose lower portions 83 are pressed rearwardly against the inside of the console 72. The lower portions 83 of the ledges 81 therefore act to confine the cowl 76 within the opening 74 and prevent the lower portion of the cowl 76 from shifting rearwardly through the console 72.

The cowl walls 80, 82 are positioned adjacent to the edges of the opening 74 to generally enclose the tilt mechanism 20. The cowl 76 pivots with the upper portion 22 of the column 18, and shifts within the dash opening 74 relative to the console 74. However, the side walls 80 of the cowl 76 extend vertically, and the upper wall 82 extends rearwardly in an arc, such that the walls 80, 82 of the cowl 76 remain directly adjacent to the edges of the opening 74 regardless of the tilted position of the column 18. Therefore, the cowling 76 acts to cover or close the opening 74 throughout the range of motion of the upper portion 22 of the column 18. This is accomplished by the preferred embodiment without the use of a costly hinge mechanism.

A button 84 is coupled to the cowl 76 via a pivot hinge 85, and abuts a second portion 86 of the push member 44 such that when the operator presses the button 84, the push member 44 is shifted forwardly and becomes disengaged from the latch plate 40. The upper portion 22 of the column 18 can then be adjusted to a different tilted position. The biasing means 50 urges the push member 44 rearwardly against the button 84 such that when the button 84 is not being engaged by the operator it is being pressed into abutment with the cowl 76. The button's close abutment with the cowl 76 during operation therefore also acts to exclude debris from reaching the internal workings of the mechanism.

Next, the operation of the preferred embodiment will be discussed. During operation of the vehicle 10, the steering column 18 is locked in a particular tilted position, such as depicted in FIG. 3. The spring 62 is compressed against the notch 68 formed in the push member 44, and also presses a washer 88 against the bracket 34. The energy in the spring 62 acts to urge the push member 44 rearwardly, thereby positioning the first portion 48 of the push member 44 within one of the latch plate recesses 42. The push member's first portion 48 is prevented from shifting up or down since it is secured within the recess 42. The bracket 34, tube 32, and upper portion 22 of the column 18 are coupled to the push member 44 via the guide means 52 and the hole 46 in the bracket 34, and are therefore also prevented from pivoting when the first portion 48 of the push member 44 is received within one of the recesses 42.

The preferred embodiment can be released from this locked position by pressing the button 84 carried by the cowling 76, as shown in FIG. 5. When the operator pushes the button 84, the button 84 forces the second portion 86 of the push member 44 forwardly against the force of the spring 62. The push member 44 thereby shifts forward longitudinally, and the first portion 48 shifts forwardly within the slots 58 formed in the guide plates 54, 56. When the button 84 has been fully depressed, the push member's first portion 48 is positioned forwardly of the teeth 90 of the latch plate 40, as shown in FIG. 5. Therefore, the first portion 48 can clear the teeth 90 to allow the push member 44 and the column's upper portion 22 to pivot. With the button 84 depressed, the operator can shift the steering wheel 14 to a different tilted position.

Once tilted to a different desired position, the steering column 18 can be looked in position again by releasing the button 84. The spring 62 then forces the push member 44 rearwardly such that the first portion 48 is forced into the recess 42 corresponding to the newly selected position of the column 18.

The arrangement and alignment of parts according to the preferred embodiment makes the tilt mechanism 20 simple and inexpensive to manufacture and assemble. When the operator presses the button 84 he applies a force to the second portion 86 of the push member 44 via the button 84 in a direction generally aligned with the direction of travel of the push member 44 as the push member 44 shifts to unlatch the first portion 48 from the latch plate 40. Therefore, no cams or pivoting lever-arm linkage's are required in order to change the direction of the force applied by the operator to the control. Rather, the push member 44 is a single part to which the operator applies a force to release the column 18 from the locked mode. Therefore, the push member 44 itself serves as the linkage between the control and the locking mechanism 38, and thereby greatly simplifies the entire apparatus. The use of a button 84 control located on the console 72 rather than a lever carried by the column 18 also facilitates a simple mechanism since no complicated linkages are required to transfer the force applied by the operator from the control button 84 to the latching mechanism 38. Further, since the control button 84 is situated in close proximity to the latch mechanism 38, the linkage extending therebetween is relatively compact and simple.

As the upper portion 22 of the column 18 pivots during adjustment by the operator, the cowl 76 pivots therewith. The spring 78 presses the cowl 76 upwardly along the tube 32 such that the upper wall 82 of the cowl 76 and the ledge 81 formed in the side wall 80 are in abutment with the inside of the console 72. The cowl 76 generally fills the opening 74 to thereby enclose the tilt mechanism 20. The cowl walls 80, 82 extend forwardly and downwardly a sufficient distance to abut the edges of the opening 74 throughout the column's range of pivotal motion. The cowl 76 therefore serves as an effective and simple mechanism for excluding debris and the effects of weather from the internal workings of the tilt mechanism regardless of the tilted position of the steering column 18.

The preferred embodiment of the present invention is described above as for use with a mechanical steering system having a universal joint that allows the rotational motion of the upper portion of the column to be transferred to the column's lower portion regardless of the pivotal position of the upper portion. However, the present invention can be utilized with hydraulic steering systems that would also allow the steering wheel to pivot.

I claim:

1. A mechanism for adjusting the inclination of a vehicle's tiltable steering column, said mechanism being controllable by an operator riding in an operator station of the vehicle, said vehicle having a longitudinal direction of travel, said mechanism comprising:
    a latch plate rigidly fixed to the vehicle, and having a plurality of recesses each corresponding to a particular tilted position of the steering column;
    a member carried by the steering column for tilting motion therewith, and having a first portion engagable with the recess, said member having engaged modes wherein the first portion is engaged within one of the recesses for operatively fixing the steering column at a corresponding tilted position, said member being shiftable to a disengaged mode wherein the first portion is disengaged from the recesses for allowing the column to tilt to a different position;
    biasing means for forcing and urging the member in a direction toward the engaged mode;
    said member having a second portion pushable by the operator to shift the member in a direction away from the engaged mode and toward the disengaged mode for shifting the member from an engaged mode to the disengaged mode, the direction that the operator pushes the second portion being generally aligned with the direction that the member shifts when traveling between the engaged and disengaged modes;
    wherein the member is a single integral part, and is aligned generally perpendicularly to the steering column.

2. The mechanism of claim 1, and further comprising:
    a dash having an opening within which the column is tiltably positioned; and
    a rigid cowling carried by the steering column for pivoting therewith within the opening, and in slidable abutment with the edges of the dash opening for generally enclosing the steering column and tilt mechanism.

3. The mechanism of claim 2, and further comprising a button control pivotally carried by the cowling and abuttable with the member's second portion for shifting the member from the engaged mode to the disengaged mode as the operator presses the button control.

4. The mechanism of claim 1, wherein the recesses are arranged in a generally vertically extending arc for receiving the first portion of the member when the column and member are in various tilted positions.

5. The mechanism of claim 1, wherein the biasing means comprises:
    a notch formed in the member; and
    a compression spring concentrically carried by the member, said compression spring having a coiled portion defining a generally uniform diameter, said compression spring also having an inwardly extending portion that defines a smaller diameter than the coiled portion for compressed abutment against the notch of the member when the spring is compressed.

6. A mechanism for adjusting the inclination of a vehicle's tiltable steering column, said mechanism being controllable by an operator riding in an operator station of the vehicle, said vehicle having a longitudinal direction of travel, said mechanism comprising:
    a latch plate rigidly fixed to the vehicle, and having a plurality of recesses arranged in a generally vertically extending arc, each recess corresponding to a particular tilted position of the steering column;
    a rod-like member carried by the steering column generally perpendicular thereto for tilting motion therewith, and having a first portion extending at an angle to the rod-like member, said first portion being engagable with the recesses, said rod-like member having engaged modes wherein the first portion is engaged within one of the recesses for operatively securing the steering column at a corresponding tilted position, said rod-like member being longitudinally shiftable to a disengaged mode wherein the first portion is disengaged from the recesses for allowing the column to tilt to a different position;
    biasing means for forcing and urging the rod-like member in the direction toward the engaged mode, said biasing means further comprising:
    a notch formed in the rod-like member; and
    a compression spring concentrically carried by the rod-like member, said compression spring having a first portion that operatively abuts against the column, and a straightened portion that abuts against the notch of the rod-like member when the compression spring is compressed;
    said rod-like member having a second portion pushable by the operator to shift the rod-like member in a direction away from the engaged mode and toward the disengaged mode and for shifting the rod-like member from an engaged mode to the disengaged mode, the direction that the operator pushes the second portion being generally aligned with the direction that the rod-like member shifts when traveling between the engaged and disengaged modes;
    wherein the rod-like member is a single integral part, and is aligned generally perpendicularly to the steering column;
    a dash having an opening within which the steering column is tiltably positioned;

a rigid cowling carried by the steering column for pivoting therewith within the opening, and in slidable abutment with the edges of the dash opening for generally enclosing the steering column and tilt mechanism;

a button control pivotally carried by the cowling and positioned to be pressed by the operator in a direction generally aligned with the rod-like member's path of travel as the rod-like member is shifted between the engaged and disengaged modes; said button being abutable with the rod-like member's second portion for shifting the rod-like member from the engaged mode to the disengaged mode as the operator presses the button control; and guide means for guiding the first portion between the engaged and disengaged modes.

7. A mechanism for concentrically coupling a compression spring to a rod-like member, comprising:

a notch formed in the rod-like member; and a compression spring concentrically carried by the rod-like member, said compression spring having a coiled portion defining a generally uniform diameter, said compression spring also having an inwardly extending portion that defines a smaller diameter than the coiled portion, said inwardly extending portion being in compressed abutment against the notch of the rod-like member when the compression spring is compressed.

8. The mechanism of claim 7, wherein the inwardly aligned portion defines a straightened portion abutable with the notch.

9. A mechanism for enclosing a vehicle's tiltable steering column, comprising:

a console rigidly fixed to the vehicle, said console having an opening within which the tiltable steering column and a cowl are tiltably positioned, said opening being defined by edges of the console; and a rigid cowl carried by the tiltable steering column for tilting therewith within the opening, said rigid cowl having generally planar side walls extending downwardly along the steering column and forwardly with respect to the vehicle, said rigid cowl also having an upper wall portion that extends forwardly in an arc from the steering column, said side and upper walls extending a distance sufficient to be positioned adjacent the edges of the console opening throughout the tiltable steering column's range of tilting for generally enclosing the tiltable steering column.

10. The invention of claim 9, and further comprising a spring carried by the tiltable steering column for pressing the rigid cowl upwardly along the tiltable steering column and into slidable abutment with the edges of the console for generally enclosing the tiltable steering column throughout the tiltable steering column's range of tilting.

* * * * *

UNITED STATES PATENT AND TRADEMARK OFFICE
CERTIFICATE OF CORRECTION

PATENT NO. : 5,088,342
DATED : 18 February 1992
INVENTOR(S) : Curtis Reinhard Bening et al.

It is certified that error appears in the above-identified patent and that said Letters Patent is hereby corrected as shown below:

In Column 7, line 38, delete "recess" and insert -- recesses --.

Signed and Sealed this

Thirteenth Day of April, 1993

Attest:

STEPHEN G. KUNIN

*Attesting Officer*  *Acting Commissioner of Patents and Trademarks*